United States Patent [19]

Murase et al.

[11] Patent Number: 5,286,687
[45] Date of Patent: Feb. 15, 1994

[54] METHOD FOR PRODUCTION OF NEEDLELIKE CRYSTALLINE PARTICLES

[75] Inventors: Yoshio Murase; Takeo Iga, both of Nagoya, Japan

[73] Assignees: Agency of Industrial Science & Technology; Ministry of International Trade & Industry, Tokyo, Japan

[21] Appl. No.: 14,526

[22] Filed: Feb. 8, 1993

Related U.S. Application Data

[63] Continuation-in-part of Ser. No. 925,666, Aug. 7, 1992, abandoned.

[30] Foreign Application Priority Data

Aug. 9, 1991 [JP] Japan .................. 3-225249

[51] Int. Cl.$^5$ .................. C04B 35/10; C01F 7/02
[52] U.S. Cl. .................. 501/128; 501/127; 423/625; 423/630
[58] Field of Search ................ 501/127, 128; 423/625, 423/630, 111

[56] References Cited

U.S. PATENT DOCUMENTS 4,053,579 10/1977 Kato et al. .................. 423/625 X
4,292,295 9/1981 Pajot et al. .................. 423/625

FOREIGN PATENT DOCUMENTS 48-83100 11/1973 Japan .
262485 12/1990 Japan .

OTHER PUBLICATIONS

Journal of Applied Physics, vol. 33, No. 1, Jan. 1962, pp. 33–39, S. S. Brenner. "Mechanical Behavior of Sapphire Whiskers At Elevated Temperatures."
Journal of the Ceramic Society of Japan, vol. 96, No. 11, 1988, pp. 1081–1086, H. Katsuki, "Preparation and Some Properities of Porous Ceramics Sheet Composed of Needle-Like Mullite."

Primary Examiner—Mark L. Bell
Assistant Examiner—David R. Sample
Attorney, Agent, or Firm—Oblon, Spivak, McClelland, Maier & Neustadt

[57] ABSTRACT

Needlelike single crystal particles of α- alumina, θ- alumina, mullite, sillimanite, etc. are produced by adding a silicon-containing substance to needlelike alumina precursor particles and heating the resultant product of addition.

7 Claims, No Drawings

METHOD FOR PRODUCTION OF NEEDLELIKE CRYSTALLINE PARTICLES

CROSS-REFERENCE TO RELATED APPLICATION

This application is a continuation-in-part of application of our copending application Ser. No. of 07/925,666, filed Aug. 7, 1992 for Method for Production of Needlelike Crystalline Particles, now abandoned.

BACKGROUND OF THE INVENTION

1. Field of the Invention

This invention relates to an improved method for the production of needlelike α-alumina, θ-alumina, mullite, and sillimanite. More particularly, it relates to a method for efficient production of needlelike α-alumina, θ-alumina, mullite, and sillimanite by using as starting material therefor needlelike alumina precursor particles or needlelike γ-alumina polycrystalline particles obtained by thermally decomposing the precursor particles mentioned above.

2. Description of the Prior Art

In the conventional methods for the production of needlelike alumina particles, the method which effects deposition of alumina whiskers on the surface of an alumina substrate by heating and decomposing aluminum chloride in a vacuum or by sweeping molten aluminum with a hydrogen gas containing a minute amount of steam at a temperature near 1,250° C. [Journal of Applied Physics, Vol. 33, pages 33 to 39 (1962)] and the method which comprises thermally decomposing fine particles of $Al(NH_4)(CO_3)(OH)_2$ as a needlelike alumina precursor [Japanese Patent Publication No. HEISEI 2-624851 have been renowned.

The former method is barely capable of producing alumina whiskers deposited on an alumina substrate in an extremely small amount of laboratory scale. The conditions of production are extremely difficult to control. The products obtained by this method have poor reproducibility in terms of kind and quality. The production cannot be obtained on a commercial scale. As respects the equipment for the operation of this method, a device for vacuum treatment necessitated for the purpose of performing a heat treatment in a vacuum, a device for controlling the vacuum pressure, a device for refining a reaction gas and controlling the flow volume of the reaction gas, a device for accurate control of the temperature of a reaction chamber, etc. which invariably are expensive. The latter method is capable of producing needlelike particles of polycrystalline γ-alumina but incapable of producing needlelike α-alumina single crystal particles which are useful for raw material for composite materials.

In the conventional methods for the production of needlelike particles of aluminum-containing oxide, the method which produces needlelike mullite particles by heat-treating and decomposing a clay mineral [journal of The Ceramic Society of Japan, Vol. 96, No. 11, pages 1081 to 1086 (1989)] has been renowned. This method is disadvantageous in respect that the production of mullite particles necessitates an additional step for separating and removing a matrix formed mainly of by-produced silica. Since this method gives rise to waste, it is undesirable from the standpoint of economization of resources and conservation of the environment.

In recent years, needlelike and fibrous ceramic materials are required in various fields. As things stand now, the raw materials which meet the requirement and which are produced on a commercial scale are whiskers and long fibers of rather limited kinds of substances such as silicon nitride, silicon carbide, and carbon. Particularly, successful cases using oxide ceramics are rare. But, needlelike α-alumina single crystal particles are actually in strong demand.

This invention satisfies the demand and aims to provide a method for producing needlelike α-alumina single crystal particles with a simple apparatus by an easy procedure with high repeatability on an economic scale without entailing occurrence of waste. This method is characterized by allowing selective production of single crystal particles of θ-alumina, mullite, sillimanite, etc. by altering the conditions to be used for the production.

SUMMARY OF THE INVENTION

Specifically, this invention is directed to a method for producing at least one needlelike single crystal particle selected from the group consisting of needlelike single crystal particles of α-alumina, θ-alumina, mullite, and sillimanite by adding a silicon-containing substance to at least one particle consisting of needlelike alumina precursor particles and γ-alumina polycrystalline particles and heating the resultant particles.

DESCRIPTION OF THE PREFERRED EMBODIMENTS

The present inventors pursued a diligent study on the transition of θ-alumina to α-alumina and the growth of alumina particles and acquired a knowledge that the addition of a very small amount of silica is extremely effective in bringing about the transition and growth mentioned above. They continued the study based on this knowledge to learn that needlelike α-alumina single crystal particles can be produced by mixing needlelike alumina precursor and/or needlelike γ-alumina polycrystalline particles obtained by thermally decomposing the precursor with a small amount of such a silicon-containing composition as silica or ethyl silicate and then heat-treating the resultant mixture. It has been further ascertained to the inventors that selective production of needlelike single crystal particles of θ-alumina, mullite, sillimanite, etc. is attained by adjusting the amount of silicon to be added and the amount of silicon in the particles to be specifically produced. This invention has been perfected on the basis of these knowledges.

Now, this invention will be described more specifically below.

The alumina precursor to be used in this invention has no particular restriction except for the sole requirement that it should be needlelike particles formed mainly of aluminum element. Any alumina precursor meeting this requirement may be effectively used herein. For example, ammonium aluminum carbonate hydroxide $[Al(NH_4)(CO_3)(OH)_2]$ is advantageously used. Further, needlelike γ-alumina polycrystalline particles which are obtained by thermally decomposing the alumina precursor mentioned above are similarly usable advantageously herein.

The silicon-containing substance to be used in the present invention has no particular restriction except for the sole requirement that it should be capable of forming an oxide of silicon on being heated in the air. Any silicon-containing substance fulfilling this requirement can be used advantageously herein. For example, such substances as ethyl silicate which is excellent in the covering property are advantageously usable herein. The mixing of the silicon-containing substance with the alumina precursor can be effected either directly between the two powders or in the state having the two powders solved or dispersed in water or alcohol.

In this invention, the needlelike alumina precursor such as, for example, $Al(NH_4)(CO_3)(OH)_2$ or $\gamma$-alumina polycrystalline particles obtained by thermally decomposing the precursor, is uniformly mixed with a very small amount of a silicon compound such as, for example, reagent grade ethyl silicate and the resultant mixture is dried. The dried mixture is then heated at a temperature in the range between 1,200° and 1,500° C. The single crystals aimed at cannot be obtained if the temperature is lower than 1,200° C. The needlelike particles to be formed are suffered to deform and cohere into lumps if the temperature exceeds 1,500° C.

Needlelike $\alpha$-alumina single crystal particles are obtained when the silicon content in the formed single crystals is up to about 2 atm % by weight. Needlelike single crystal particles of $\theta$-alumina, mullite, sillimanite, etc. are obtained when the silicon content mentioned above exceeds 2 atm % by weight.

The length and thickness of these particles depend on the size of the alumina precursor particles used in the production. To be specific, needlelike single crystal particles measuring about 1 micron in length and about 0.1 micron in thickness are easily obtained.

Now, the method for producing needlelike $\alpha$-alumina particles from needlelike $Al(NH_4)(CO_3)(OH)_2$ will be described more specifically below.

First, an account will be presented of the needlelike $Al(NH_4)(CO_3)(OH)_2$. This invention does not discriminate this compound on account of the method to be adopted for its production. Typical examples of the method are cited below.

1) The needlelike $Al(NH_4)(CO_3)(OH)_2$ particles are obtained by adding an aqueous ammonium alum solution to an aqueous ammonium hydrogen carbonate solution thereby forming a white precipitate, heating the aqueous solution containing the formed precipitate in a tightly closed container, and thereafter separating the precipitate from the solution.

2) The needlelike $Al(NH_4)(CO_3)(OH)_2$ particles are obtained by preparing $Al(OH)_3$ from ammonium alum and aqua ammonia, heating this product in an aqueous ammonium hydrogen carbonate solution in a tightly closed container thereby inducing formation of a precipitate therein, and separating the formed precipitate from the solution.

The method of this invention for producing $\alpha$-alumina from the needlelike $Al(NH_4)(CO_3)(OH)_2$ particles will be described below.

Specifically, the production is effected by subjecting the needlelike $Al(NH_4)(CO_3)(OH)_2$ particles and a silicon-containing compound such as, for example, ethyl silicate to a solid-state reaction.

To be more specific, the needlelike $Al(NH_4)(CO_3)(OH)_2$ particles and a silicon-containing compound such as ethyl silicate added thereto in an amount of 0.1 to 2% by weight in terms of silicon based on the amount of the needlelike particles are thoroughly mixed and the resultant mixture is heated in air at a temperature in the range of from 1,100° to 1,400° C. to produce needlelike $\alpha$-alumina particles.

In the method described above, though $Al(NH_4)(CO_3)(OH)_2$ and the silicon-containing compound may be mixed in their unaltered form, they can be thoroughly mixed, for example, by dispersing the needlelike $Al(NH_4)(CO_3)(OH)_2$ particles in a liquid such as ethanol and adding the silicon-containing compound to the resultant dispersion.

The reaction of $Al(NH_4)(CO_3)(OH)_2$ with the silicon-containing compound proceeds in a solid state and, therefore, the reactants are not fused while they are in the process of heating.

The needlelike $Al(NH_4)(CO_3)(OH)_2$ particles used as the raw material and the produced needlelike $\alpha$-alumina particles have the following relation regarding width and length of particle.

The raw material particles measure 0.01 to 0.1 $\mu$m in width and 0.5 to 3.0 $\mu$m in length and the product particles measure 0.005 to 0.05 $\mu$m in width and 0.3 to 2.0 $\mu$m in length.

The $\alpha$-alumina is produced from $Al(NH_4)(CO_3)(OH)_2$ by the following reaction.

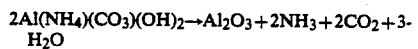

$$2Al(NH_4)(CO_3)(OH)_2 \rightarrow Al_2O_3 + 2NH_3 + 2CO_2 + 3H_2O$$

In the particles produced by this reaction, alumina and Si coexist without forming a compound.

Besides simple silica, ethyl silicate proves desirable from the practical point of view as the silicon-containing compound to be used in this invention.

When the heat treatment of $Al(NH_4)(CO_3)(OH)_2$ is carried out in the absence of a silicon-containing compound, the produced $\alpha$-alumina fails to assume the shape of needles.

In accordance with the method of this invention, needlelike single crystal particles of $\alpha$-alumina, $\theta$-alumina, mullite, or sillimanite can be produced from a needlelike alumina precursor with a simple apparatus by an easy procedure efficiently with highly satisfactory reproducibility without entailing occurrence of waste.

The single crystal particles of $\alpha$-alumina, $\theta$-alumina, mullite, sillimanite, etc. which are obtained by the method of this invention are used as follows.

For example, long alumina fibers are produced by mixing the single crystal particles with a small amount of a macromolecular solution in the form of paste, spinning the resultant mixture into long fibers, and heating and sintering the long fibers.

Papers, filters, separating films, heat-insulating films, noise-abating films, etc. of alumina are produced from the single crystal particles by the papermaking technique.

Porous bulk sintered materials find utility such as in biomaterials, catalyst support, and insulating materials.

They may be combined with other ceramic or metallic substances to produce composite ceramics of high strength and high toughness and aluminum alloy composite materials of high strength.

Now, this invention will be described more specifically below with reference to working examples.

EXAMPLE 1

When 10 ml of an aqueous solution containing ammonium alum at a concentration of 0.1 mol/liter was added at room temperature to 10 ml of an aqueous solution containing ammonium hydrogen carbonate at a concentration of 1.2 mols/liter, the resultant mixture formed a white precipitate. The precipitate as held in the mother liquid was moved into a tightly closed container and heat-treated therein at 100° C. for 20 hours. After the heat treatment, the precipitate was separated and washed with water. Consequently, 0.14 g of needlelike Al(NH$_4$)(CO$_3$)(OH)$_2$ particles measuring 0.05 micron in average width and 1.5 microns in average length were obtained. The particles were dispersed in ethanol. The produced dispersion and 0.02 g of reagent grade ethyl silicate added thereto were mixed by stirring. The resultant mixture was dried. The produced particles were heat-treated in air at 1,300° C. for one hour. The resultant particles were found by the X-ray diffraction to be α-alumina crystals. By the observation under a transmission electron microscope, it was confirmed that these particles consisted of needlelike particles measuring about 1 micron in length and about 0.03 micron in width and that these particles were single crystals. The total weight of the produced particles was 0.05 g. By the use of an energy dispersion type X-ray spectrometer attached to an analytical electron microscope, these particles were found to have a Si content of 1 atomic %.

EXAMPLE 2

Al(OH)$_3$ was prepared from ammonium alum and aqua ammonia. It was then aged in an aqueous solution containing ammonium hydrogen carbonate at a concentration of 1 mol/liter at 100° C. for 24 hours to obtain 0.1 g of needlelike Al(NH$_4$)(CO$_3$)(OH)$_2$ particles as an alumina precursor. These particles measured 0.5 micron in average length and 0.03 micron in average width. The particles and 0.02 g of reagent grade ethyl silicate added thereto were mixed by stirring. The resultant mixture was dried. The produced particles were heat-treated in air at 1,300° C. for one hour. It was confirmed by the X-ray diffraction and the observation under a transmission electron microscope that these particles consisted of needlelike α-alumina single crystals. The total weight of the produced particles was 0.03 g. By the use of an energy dispersion type X-ray spectrometer attached to an analytical electron microscope, these particles were found to have a Si content of 1.4 atomic %.

EXAMPLE 3

In the procedure of Example 1, the reagent grade ethyl silicate was put to use after it had undergone a polymerization treatment to some extent. To be specific, 116 g of reagent grade ethyl silicate was solved in 18 ml of ethanol. The resultant solution and a mixed solution consisting of 18 ml of ethanol, 21 g of distilled water, and 0.53 g of hydrochloric acid were stirred and kept at 80° C. for three hours. The procedure of Example 1 was repeated, excepting 0.02 g of the solution thus obtained was used. In the present example, needlelike particles of θ-alumina and mullite were obtained. By the use of an energy dispersive X-ray spectrometer attached to the analysis electron microscope, this powder was found to have a Si content of 3 atm %.

EXAMPLE 4

Needlelike particles of mullite were obtained by following the procedure of Example 3, except that the amount of the same ethyl silicate solution to be used was changed to 0.2 g. This powder was found to have a Si content of 26 atm %.

What is claimed is:

1. A method for the production of α-alumina particles having a Si content in the range of from 0.1 to 2 atomic % and measuring 0.005 to 0.05 microns in average width and from 0.3 to 2.0 microns in average length comprising mixing Al(NH$_4$)(CO$_3$)(OH)$_2$ particles measuring from 0.01 to 0.1 microns in average width and from 0;.5 to 3.0 microns in average length with 0.1 to 2% by weight in terms of silicon, based on the amount of said Al(NH$_4$)(CO$_3$)(OH)$_2$ particles of a silicon-containing compound to form a mixture, and heat-treating the mixture in air at a temperature in the range of from 1200 to 1500° C.

2. The method according to claim 1, further comprising mixing said Al(NH$_4$)(CO$_3$)(OH)$_2$ particles with said silicon-containing compound wherein said silicon-containing compound is in the form of a dispersion in a solvent to form a mixture, drying said mixture, and heat-treating said dried mixture in air at a temperature of from 1200° to 1500° C.

3. A method according to claim 1, wherein said silicon-containing compound is at least one member selected from the group consisting of ethyl silicate and silica.

4. The method of claim 2, wherein said Al(NH$_4$)(CO$_3$)(OH)$_2$ particles are in the form of a dispersion in a solvent.

5. The method of claim 4, wherein said solvent is water.

6. The method of claim 4, wherein said solvent is an alcohol.

7. The method of claim 6, wherein said alcohol is ethanol.

* * * * *